(12) United States Patent
Wilkerson

(10) Patent No.: US 10,163,074 B2
(45) Date of Patent: Dec. 25, 2018

(54) VEHICLE-BASED METHODS AND SYSTEMS FOR MANAGING PERSONAL INFORMATION AND EVENTS

(75) Inventor: Brian Y. Wilkerson, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1745 days.

(21) Appl. No.: 12/831,307

(22) Filed: Jul. 7, 2010

(65) Prior Publication Data

US 2012/0010805 A1 Jan. 12, 2012

(51) Int. Cl.
*G06Q 10/00* (2012.01)
*G06F 17/30* (2006.01)
(Continued)

(52) U.S. Cl.
CPC .................. *G06Q 10/109* (2013.01)

(58) Field of Classification Search
CPC ......... G06Q 10/109; G06Q 10/063116; G06Q 10/1093; G06Q 10/06; G06Q 10/06311; G06Q 10/06314; G06Q 10/1095; G06Q 10/00; H04M 3/432; H04M 3/565; H04M 3/56; H04W 4/02; G06F 3/0481; G06F 17/30551; G06F 21/33; G06F 3/023; G06F 9/4443; G06F 17/30; G01C 21/362;
(Continued)

(56) References Cited

U.S. PATENT DOCUMENTS

| 6,028,537 A | 2/2000 | Suman et al. |
| 6,278,772 B1 | 8/2001 | Bowater et al. |
| (Continued) | | |

FOREIGN PATENT DOCUMENTS

| EP | 1969458 | 9/2008 |
| JP | 2007205872 A | 8/2007 |
| (Continued) | | |

OTHER PUBLICATIONS

Ford Motor Company, "SYNC with Navigation System," Owner's Guide Supplement, SYNC System Version 1 (Jul. 2007).
(Continued)

*Primary Examiner* — Yuri Kan
(74) *Attorney, Agent, or Firm* — Jennifer Stec; Brooks Kushman P.C.

(57) ABSTRACT

Various embodiments may include a vehicle-based system and method for managing a user's personal information and events. A user's personal communications (such as verbal and non-verbal communications) may be monitored to identify one or more unscheduled personal events. A determination may be made whether the unscheduled personal events conflict with one or more previously scheduled personal events or personal events pending for scheduling. The scheduled personal events or pending personal events may be obtained from recorded conversations, emails, text messages, social networking messages, and the like. Based on the determination, one or more actions may be taken on the unscheduled personal events. A determination may also be made whether to add the contact with whom the user is having a personal communication to the user's address book based on whether a personal relationship exists with the contact.

10 Claims, 3 Drawing Sheets

(51) Int. Cl.
  *H04N 21/45* (2011.01)
  *G06N 5/00* (2006.01)
  *H04B 3/36* (2006.01)
  *G06Q 10/10* (2012.01)

(58) Field of Classification Search
  CPC ...... G01C 21/20; H04L 67/10; H04N 21/233;
        H04N 21/23418; H04N 21/45; G11B
        27/034; H04B 3/36
  USPC .... 705/7.16, 7.19, 7.13, 7.18; 701/400, 465,
        701/469, 749, 538; 379/142.17, 201.12;
        348/14.01; 455/418, 456.3; 726/3;
        725/1, 61, 53; 707/999.1, 100; 715/205
  See application file for complete search history.

(56) References Cited

U.S. PATENT DOCUMENTS

| | | | |
|---|---|---|---|
| 6,385,535 B2 | 5/2002 | Ohishi et al. | |
| 6,411,899 B2 | 6/2002 | Dussell et al. | |
| 6,430,488 B1 | 8/2002 | Goldman et al. | |
| 6,459,969 B1 | 10/2002 | Bates et al. | |
| 6,505,780 B1 | 1/2003 | Yassin et al. | |
| 6,600,975 B2 | 7/2003 | Moriguchi | |
| 6,629,033 B2 | 9/2003 | Preston et al. | |
| 6,728,349 B2 | 4/2004 | Chang et al. | |
| 6,845,251 B2 | 1/2005 | Everhart et al. | |
| 6,928,428 B1* | 8/2005 | De Vries | 707/749 |
| 6,993,490 B2 | 1/2006 | Chen et al. | |
| 7,065,533 B2 | 6/2006 | Arrouye et al. | |
| 7,120,928 B2 | 10/2006 | Sheth et al. | |
| 7,127,259 B2 | 10/2006 | Ueda et al. | |
| 7,129,825 B2 | 10/2006 | Weber | |
| 7,139,722 B2 | 11/2006 | Perrella et al. | |
| 7,142,664 B2 | 11/2006 | Seligmann | |
| 7,143,058 B2 | 11/2006 | Sugimoto et al. | |
| 7,145,998 B1 | 12/2006 | Holder et al. | |
| 7,162,237 B1 | 1/2007 | Silver et al. | |
| 7,283,813 B2 | 10/2007 | Hamanaga et al. | |
| 7,340,691 B2 | 3/2008 | Bassett et al. | |
| 7,346,630 B2 | 3/2008 | Eichstaedt et al. | |
| 7,370,079 B2 | 5/2008 | Murata et al. | |
| 7,376,226 B2 | 5/2008 | Holder et al. | |
| 7,433,714 B2 | 10/2008 | Howard et al. | |
| 7,444,384 B2 | 10/2008 | Horvitz | |
| 7,469,827 B2 | 12/2008 | Katragadda et al. | |
| 7,474,264 B2 | 1/2009 | Bolduc et al. | |
| 7,552,009 B2 | 6/2009 | Nelson | |
| 7,586,956 B1 | 9/2009 | Mishra et al. | |
| 7,725,480 B2 | 5/2010 | Bassett et al. | |
| 7,747,246 B2 | 6/2010 | Zellner et al. | |
| 7,801,283 B2 | 9/2010 | Harwood et al. | |
| 7,813,950 B2 | 10/2010 | Perrella et al. | |
| 7,889,096 B2 | 2/2011 | Breed | |
| 7,917,285 B2 | 3/2011 | Rothschild | |
| 7,985,911 B2 | 7/2011 | Oppenheimer | |
| 8,112,720 B2 | 2/2012 | Curtis | |
| 8,126,889 B2 | 2/2012 | Pitt | |
| 8,223,975 B2 | 7/2012 | Marko | |
| 8,233,890 B2 | 7/2012 | Zellner et al. | |
| 8,316,046 B2 | 11/2012 | Huang et al. | |
| 8,424,043 B1* | 4/2013 | McClellen et al. | 725/61 |
| 2001/0037174 A1* | 11/2001 | Dickerson | 701/200 |
| 2002/0068583 A1* | 6/2002 | Murray | H04M 3/432 455/456.3 |
| 2002/0107032 A1 | 8/2002 | Agness et al. | |
| 2002/0143879 A1 | 10/2002 | Sommerer | |
| 2003/0131023 A1 | 7/2003 | Bassett et al. | |
| 2003/0212480 A1 | 11/2003 | Lutter et al. | |
| 2003/0222765 A1* | 12/2003 | Curbow | G06Q 10/109 340/309.7 |
| 2004/0073643 A1 | 4/2004 | Hayes et al. | |
| 2004/0090121 A1 | 5/2004 | Simonds et al. | |
| 2004/0092253 A1 | 5/2004 | Simonds et al. | |
| 2004/0093154 A1 | 5/2004 | Simonds et al. | |
| 2004/0093155 A1 | 5/2004 | Simonds et al. | |
| 2004/0192270 A1 | 9/2004 | Kreitzer | |
| 2004/0220768 A1 | 11/2004 | Klein | |
| 2004/0254715 A1 | 12/2004 | Yamada | |
| 2004/0268270 A1 | 12/2004 | Hill et al. | |
| 2005/0019228 A1 | 1/2005 | Myers et al. | |
| 2005/0088284 A1 | 4/2005 | Zai et al. | |
| 2005/0149520 A1* | 7/2005 | De Vries | 707/5 |
| 2006/0058948 A1 | 3/2006 | Blass et al. | |
| 2006/0168627 A1 | 7/2006 | Zeinstra et al. | |
| 2006/0258377 A1 | 11/2006 | Economos et al. | |
| 2006/0290490 A1 | 12/2006 | Kraus et al. | |
| 2006/0294036 A1* | 12/2006 | Horvitz | G06N 7/005 706/45 |
| 2007/0004387 A1 | 1/2007 | Gadamsetty et al. | |
| 2007/0016362 A1 | 1/2007 | Nelson | |
| 2007/0042812 A1 | 2/2007 | Basir | |
| 2007/0044037 A1 | 2/2007 | Amari et al. | |
| 2007/0061067 A1 | 3/2007 | Zeinstra et al. | |
| 2007/0120948 A1* | 5/2007 | Fujioka et al. | 348/14.01 |
| 2007/0140187 A1 | 6/2007 | Rokusek et al. | |
| 2007/0233725 A1 | 10/2007 | Michmerhuizen et al. | |
| 2007/0238491 A1 | 10/2007 | He | |
| 2007/0285256 A1 | 12/2007 | Batra | |
| 2007/0294304 A1 | 12/2007 | Bassett et al. | |
| 2007/0299882 A1 | 12/2007 | Padgett et al. | |
| 2008/0005680 A1 | 1/2008 | Greenlee | |
| 2008/0057927 A1 | 3/2008 | Han | |
| 2008/0086455 A1 | 4/2008 | Meisels et al. | |
| 2008/0140488 A1* | 6/2008 | Oral | G06Q 10/063116 705/7.16 |
| 2008/0150685 A1 | 6/2008 | Desai et al. | |
| 2008/0159503 A1* | 7/2008 | Helbling | H04M 3/565 379/142.17 |
| 2008/0167937 A1* | 7/2008 | Coughlin | G01C 21/20 705/7.16 |
| 2008/0263069 A1* | 10/2008 | Harris | G06F 21/33 |
| 2008/0281518 A1* | 11/2008 | Dozier et al. | 701/213 |
| 2008/0294483 A1* | 11/2008 | Williams | 705/8 |
| 2008/0294663 A1* | 11/2008 | Heinley | G06F 3/0481 |
| 2008/0319653 A1 | 12/2008 | Moshfeghi | |
| 2008/0319665 A1 | 12/2008 | Berkobin et al. | |
| 2009/0005966 A1 | 1/2009 | McGray et al. | |
| 2009/0011799 A1 | 1/2009 | Douthitt et al. | |
| 2009/0056525 A1 | 3/2009 | Oppenheimber | |
| 2009/0074168 A1* | 3/2009 | Henry | 379/201.12 |
| 2009/0075624 A1 | 3/2009 | Cox et al. | |
| 2009/0094088 A1* | 4/2009 | Chen et al. | 705/9 |
| 2009/0111422 A1 | 4/2009 | Bremer et al. | |
| 2009/0112608 A1 | 4/2009 | Abu-Hakima et al. | |
| 2009/0144622 A1 | 6/2009 | Evans et al. | |
| 2009/0157615 A1 | 6/2009 | Ross et al. | |
| 2009/0157717 A1 | 6/2009 | Palahnuk et al. | |
| 2009/0158200 A1 | 6/2009 | Palahnuk et al. | |
| 2009/0193149 A1 | 7/2009 | Khosravy | |
| 2009/0248285 A1 | 10/2009 | Bauer | |
| 2009/0267757 A1 | 10/2009 | Nguyen | |
| 2009/0312901 A1 | 12/2009 | Miller et al. | |
| 2010/0017543 A1 | 1/2010 | Preston et al. | |
| 2010/0062714 A1 | 3/2010 | Ozaki | |
| 2010/0086112 A1 | 4/2010 | Jiang et al. | |
| 2010/0125801 A1 | 5/2010 | Shin | |
| 2010/0136944 A1 | 6/2010 | Taylor et al. | |
| 2010/0148920 A1 | 6/2010 | Philmon et al. | |
| 2010/0159964 A1 | 6/2010 | Ferro | |
| 2010/0210302 A1 | 8/2010 | Santori et al. | |
| 2010/0227629 A1 | 9/2010 | Cook et al. | |
| 2010/0228803 A1 | 9/2010 | Quinn | |
| 2010/0233957 A1 | 9/2010 | Dobosz | |
| 2010/0235891 A1 | 9/2010 | Oglesbee et al. | |
| 2010/0274689 A1 | 10/2010 | Hammad et al. | |
| 2010/0274865 A1 | 10/2010 | Frazier et al. | |
| 2010/0287024 A1 | 11/2010 | Ward et al. | |
| 2010/0330975 A1* | 12/2010 | Basir | 455/418 |
| 2011/0021234 A1 | 1/2011 | Tibbitts et al. | |

(56) References Cited

U.S. PATENT DOCUMENTS

| | | |
|---|---|---|
| 2011/0039581 A1 | 2/2011 | Cai et al. |
| 2011/0040707 A1 | 2/2011 | Theisen et al. |
| 2011/0045810 A1 | 2/2011 | Issa et al. |
| 2011/0072492 A1* | 3/2011 | Mohler et al. ............... 726/3 |
| 2011/0087705 A1 | 4/2011 | Swink et al. |
| 2011/0121991 A1 | 5/2011 | Basir |
| 2011/0137520 A1 | 6/2011 | Rector et al. |
| 2011/0137773 A1 | 6/2011 | Davis, III et al. |
| 2011/0144980 A1 | 6/2011 | Rysenga |
| 2011/0176670 A1 | 7/2011 | Kaplan et al. |
| 2011/0257881 A1* | 10/2011 | Chen et al. ............... 701/204 |
| 2011/0289522 A1* | 11/2011 | Pontual et al. ............... 725/1 |
| 2011/0298924 A1 | 12/2011 | Miller et al. |
| 2011/0300843 A1 | 12/2011 | Miller et al. |
| 2011/0300884 A1 | 12/2011 | Ollila et al. |
| 2012/0010805 A1* | 1/2012 | Wilkerson ............... 701/200 |
| 2012/0030713 A1* | 2/2012 | Begeja ............... G11B 27/034 725/53 |
| 2012/0041633 A1 | 2/2012 | Schunder et al. |
| 2012/0050028 A1 | 3/2012 | Mastronardi et al. |
| 2012/0130953 A1 | 5/2012 | Hind et al. |
| 2012/0149441 A1 | 6/2012 | Saito et al. |
| 2012/0158918 A1 | 6/2012 | Leblanc et al. |
| 2012/0202525 A1 | 8/2012 | Pettini |
| 2012/0225677 A1 | 9/2012 | Forstall et al. |
| 2012/0271676 A1 | 10/2012 | Aravamudan et al. |
| 2012/0272176 A1 | 10/2012 | Nielsen et al. |
| 2012/0044089 A1 | 12/2012 | Yarnold et al. |
| 2013/0024109 A1 | 1/2013 | Hosotani et al. |
| 2013/0124085 A1 | 5/2013 | Mochizuki et al. |

FOREIGN PATENT DOCUMENTS

| | | |
|---|---|---|
| JP | 2008172820 A | 7/2008 |
| RU | 2229398 C1 | 5/2004 |
| WO | 03107129 A2 | 12/2003 |
| WO | 2011016886 A1 | 2/2011 |

OTHER PUBLICATIONS

Ford Motor Company, "SYNC," Owner's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem", Automotive Design & Production, Oct. 2003, http://findarticles.com, pp. 1-3.
AppManiax, Inc. "PhonePlus Callback". http://www.handango.com/catalog/ProductDetails.jsp?productId=254405&platformId=80.
Christoph Hammerschmidt, MELEXIS, The Sky's the Limit, Continental NXP to integrate NFC into cars, Feb. 17, 2011, http://automotive-eetimes.com/en/continental-nxp-to-integrate-nfc-into-cars.html?cmp_id=.
Blackberry, Blackberry Curve Series Blackberry Curve 9300/9330 Smartphones, User Guide Version 6.0, www.blackberry.com/docs/smartphones.
jNetX Call Reminder for BlackBerry. Feb. 17, 2009. Retrieved from: http://www.pocketberry.com/2009/02/17/jnetx-call-reminder-for-blackberry/.
Zancho, W. (Dec. 20, 2005). "Preference handling method e.g. for audio attributes, involves arbitrating perferences of several users based on arbitrating preferences of several users based on arbitration scheme of controller and controlling operation of domain system based on arbitration of preferences."
Search Report for German Applications 102011089349.0 dated Jan. 8, 2013. 7 pgs.
Chinese Patent Office, Third Office Action for the corresponding Chinese Patent Application No. 201110189304.3, dated May 23, 2016.
The Federal Institute of Industrial Property (FIIP), Inquiry for the corresponding Russian Patent Application No. 2011127894/11(041307).

* cited by examiner

VEHICLE-BASED METHODS AND SYSTEMS FOR MANAGING PERSONAL INFORMATION AND EVENTS

BACKGROUND

1. Technical Field

One or more embodiments relate to tools for managing a vehicle occupant's personal events using information from one or more vehicle occupant-related information sources. The vehicle occupant's personal information and events may be managed in-vehicle and/or outside of the vehicle. In some embodiments, the personal information and event manager may use the information to navigate a vehicle occupant to one or more destinations.

2. Background Art

Various tools that use user input, such as voice, to perform actions, such as navigating a route, are offered in the art.

For example, U.S. Pat. No. 6,385,535 issued to Ohishi et al. discloses a navigation system. The navigation system has a navigation controller that includes a voice recognition unit for recognizing a predetermined word from spoken utterances of a user. It also includes a destination supposition and suggestion unit for predicting an appropriate destination desired by a user, based on a user's speech, and audibly suggests the predicted destination, and destination entry unit. If the suggested destination satisfies a user, the destination entry unit enters into the navigation controller the suggested destination.

U.S. Application Publication No. 2008/0086455 to Meisels et al. discloses communicating appointment and/or mapping information among a calendar application and a navigation application. Directions are provided to an appointment location appearing in a calendar application. An appointment in a calendar application is identified, a geographic location of the appointment determined, another geographic location associated with a user of the calendar application identified, directions between the geographic location of the appointment and the geographic location of the other location are generated, and the generated directions are provided to the user.

SUMMARY

One aspect includes a personal event management system for managing a user's personal schedule. A vehicle computer may be configured to monitor at least one verbal or non-verbal personal communication to identify one or more unscheduled personal events. A determination may be made whether the unscheduled personal events conflict with one or more previously scheduled personal events or personal events pending for scheduling. The scheduled personal events or personal events for scheduling may be obtained from one or more information sources (including, but not limited to, voice-based, text-based, social networking information sources, calendar information, phonebook information, and the like). If a conflict exists, the user may be notified visually or audibly of the conflict. Otherwise, the user may be queried to determine if the personal event should be scheduled.

In one embodiment, the vehicle computer may be further configured to determine if the contact with whom the personal communication is occurring is unlisted in an address book contact on a nomadic device. If unlisted and if a personal relationship exists with the contact (based on, for example, information from a social networking information source), the vehicle computer may be further configured to receive instructions to add the contact to the address book if a personal relationship exists.

In another aspect, a method may include receiving on a vehicle computer scheduled personal events or pending personal events. A personal communication to or from a user may be detected from which unscheduled personal events may be identified. A personal communication may be a telephonic conversation, a verbal conversation between two or more people inside a vehicle, a social networking message, an electronic mail message, a text message, and the like. A determination may be made whether the unscheduled personal events conflict with the scheduled personal events or pending personal events. Based on the determination, an action may be taken on the unscheduled personal event. For example, if a conflict is present, the user may be queried to identify the action to take on the conflict. Alternatively, if a conflict does not exist, the unscheduled personal event may be scheduled.

In some embodiments, the unscheduled and scheduled personal events may include one or more locations for the scheduled and unscheduled events. In this case, the method may also include, generating a navigation schedule based on the scheduled events and the unscheduled events. Based on the locations that are identified from the unscheduled and scheduled events, a navigation route may be routed for the unscheduled and scheduled personal events according to the navigation schedule.

In one embodiment, the unscheduled personal events may be identified based on triggers for identifying the unscheduled personal events. These may include, but are not limited to, keywords, keyphrases, abbreviations, graphics, acronyms, dates, times, and numbers.

In some embodiments, one or more decision factors may be used in determining the action to take. These decision factors may include, but are not limited to, personal relationships and affiliations, historical behavior, voice inflection, and frequency of behavior.

Another aspect may include a method for managing one or more personal events of a user. One or more personal communications to or from a user may include one or more unscheduled activities for user participation. The one or more activities may include information identifying a location. The method may further include receiving scheduled activities comprising information identifying a location for each scheduled activity. The locations may be identified. Further, a navigation schedule, based on the scheduled activities and the unscheduled activities, may be generated. Using the locations, a navigation route may be routed for the unscheduled and scheduled activities according to the navigation schedule.

In one embodiment, the personal communications may include notifications of the user's tardiness. As such, the navigation schedule may be updated based on the user's tardiness.

These and other aspects will be better understood in view of the attached drawings and following detailed description of the invention.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

Detailed embodiments of the invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Figure 1:
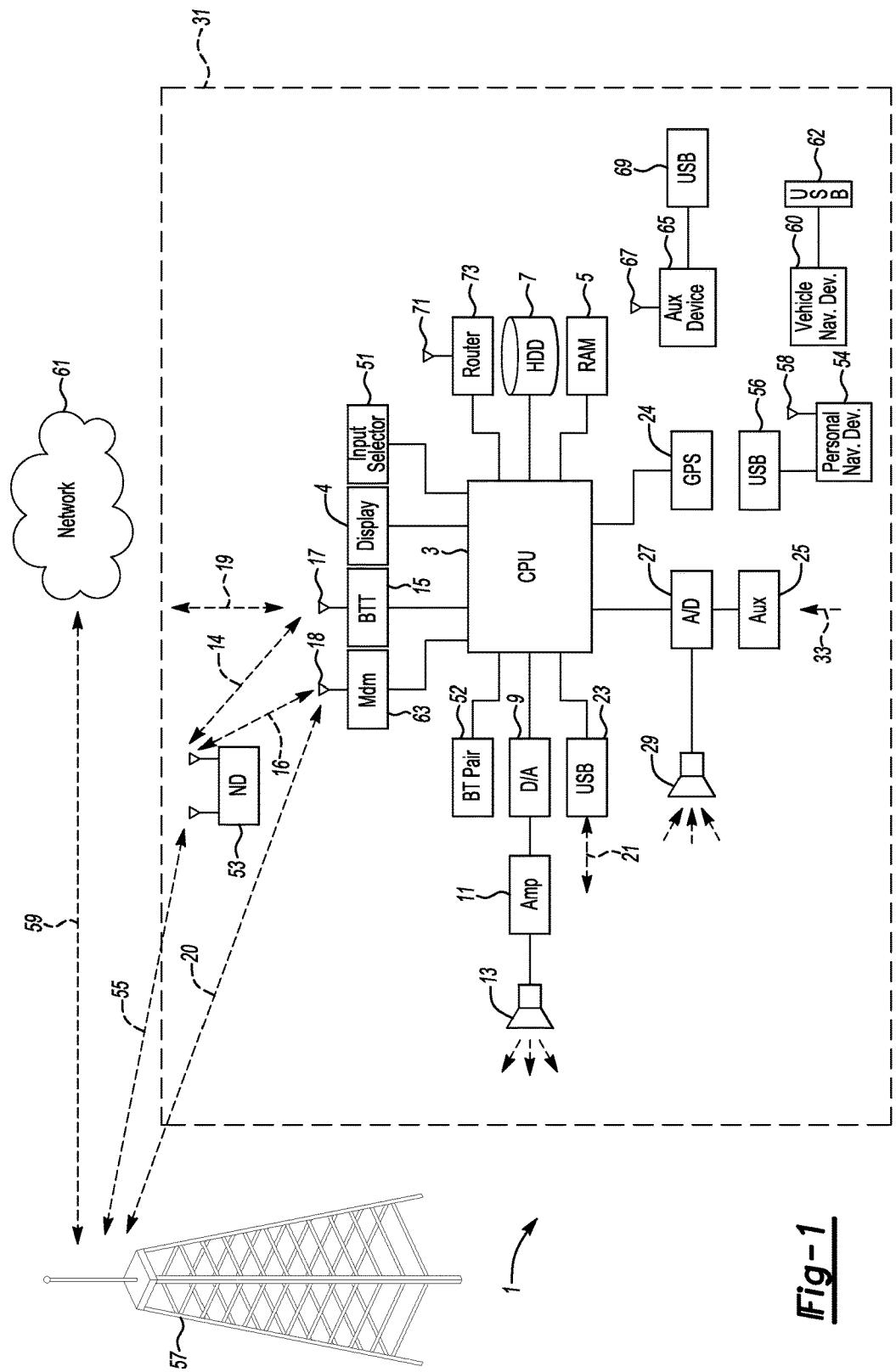
FIG. 1 is a block topology of a vehicle infotainment computing system.

FIG. 1 illustrates an example block topology for a vehicle based computing system 1 (VCS) for a vehicle 31. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH Trasceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Figure 2:
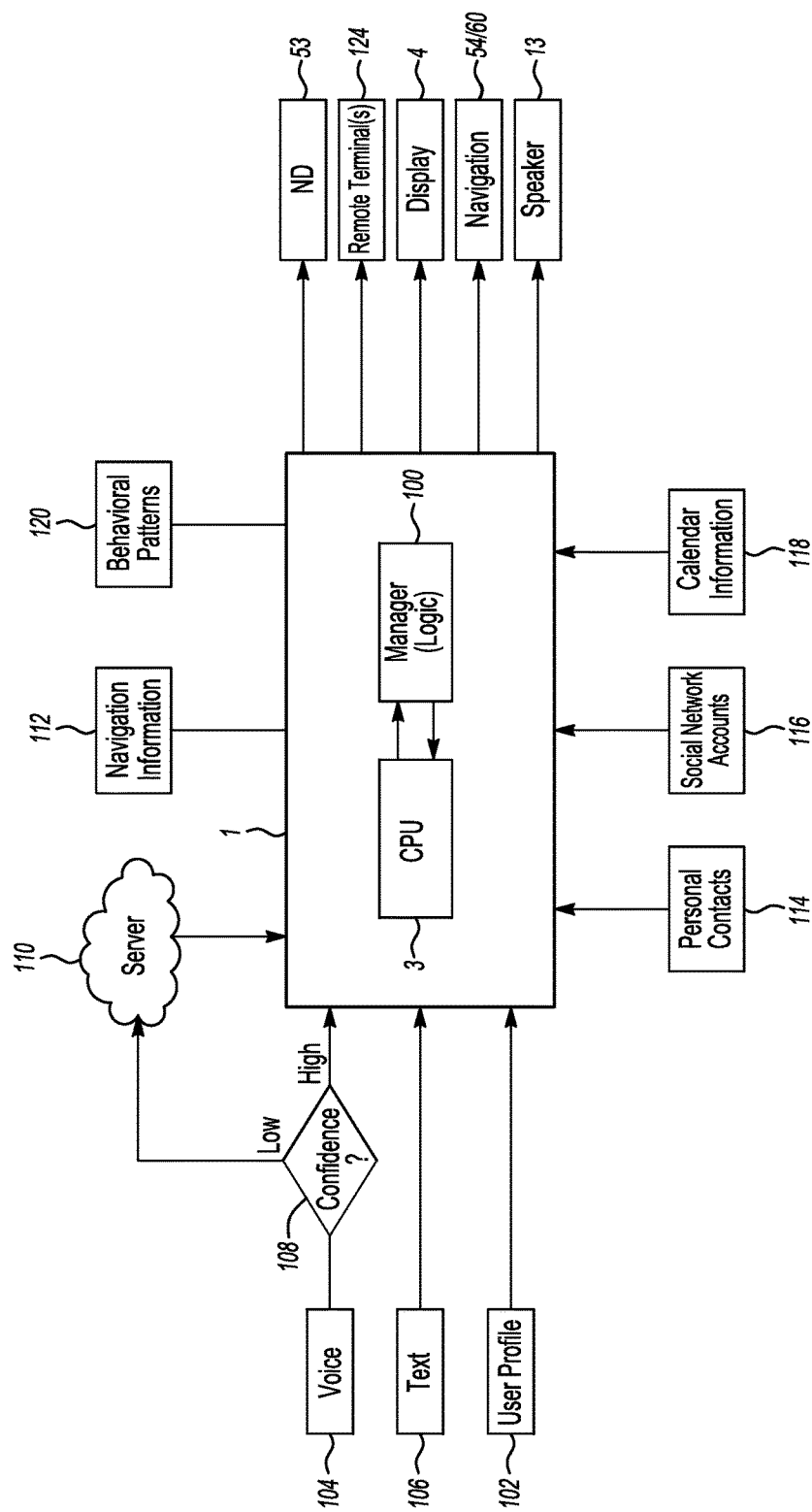
FIG. 2 is a block topology of a in-vehicle personal event manager.

FIG. 2 illustrates a block topology for a personal event manager. It will be appreciated that the disclosure and arrangement of FIG. 2 may be modified or re-arranged to best fit a particular implementation of the various embodiments of the invention. Further, it should be understood that the implementation of the architecture illustrated in FIG. 2 is not limited to an in-vehicle system. It may additionally or alternatively be implemented in a nomadic device or as an off-board system (e.g., as a cloud-based service). For clarity and illustration, FIG. 2 and its associated description pertain to an in-vehicle personal event management system.

Unmanaged information may be managed by a personal event and information manager 100 using information from one or more information sources. Unmanaged information (such as unscheduled events and activities and/or unlisted personal contacts in the user's address book) may be obtained or identified by the manager 100 from personal communications between a user and at least one other person. Personal communications or conversations may include live telephone conversations, live in-person conversations, electronic mail messages, text messages, social networking messages, and the like.

The information that may be obtained by the manager 100 from the information sources may include, but is not limited to, descriptions of events and activities, dates and times of activities and events, locations (such as addresses and POIs) of events and activities, and personal contacts. The information sources will be described in detail below.

The manager 100 may monitor verbal personal communications (e.g., and without limitation, telephonic communications, in-person communications, VOIP communications) and/or non-verbal personal communications (e.g., and without limitation, messages on social networking sites, email messages, and text messages) for detecting unmanaged personal communication. Alternatively or additionally, the manager 100 may receive an indication that personal communications with the user is unmanaged. This indication may be an identifier recognized by the manager 100 that is attached to and transmitted with the personal communication. Unmanaged personal communications may include events and activities that are not scheduled in a user's calendar nor are pending to be scheduled.

Events and activities may be pending to be scheduled if the events and activities have been presented to the user, but have not been entered into the user's calendar. This may be done, for example, when the user receives an invitation for an event or activity, but chooses to schedule it later. In this case, the event or activity may have an associated flag or other identifier indicating that the event or activity is pending. Unmanaged personal communications may also include personal contacts that are not listed in a user's address book.

Once unmanaged personal communication is detected, unmanaged information that requires management by the manager 100 may be identified based on a data dictionary of triggers found in the personal communications. These triggers may be used to trigger information handling logic of the manager 100 to be run. The data dictionary may be stored as a database or other look up table (not shown) and may be regularly updated manually or automatically according to methods known in the art by an OEM and/or the user. The database may be stored on the VCS 1, on a server (not shown) and/or on ND 53. These triggers may include, but are not limited to, keywords, names, phrases, abbreviations, various permutations of words, various permutations of syntax, numbers, phone numbers, time, acronyms, misspellings of words, and the like. In some embodiments, the database may also include graphic images such as emoticons.

In some embodiments, there may be multiple data connections, for example (and without limitation), BLUETOOTH and WiFi. In this case, data to the manager 100 may be received by the manager 100 simultaneously or non-simultaneously over different data connections.

The manager 100 may receive relevant information for managing and facilitating activities and events of the user. Managing and facilitating unmanaged information may include, but is not limited to, scheduling events and activities, determining schedule conflicts, navigating to one or more scheduled or unscheduled events or activities, determining scheduling priorities, determining navigation priorities, recommending a time schedule and/or a navigation schedule for multiple destinations and events, recommending venues, providing schedule reminders, adding personal contacts, and removing personal contacts. It will be appreciated that the arrangement of the information sources in FIG. 2 is non-limiting and provided for illustration. The types and arrangement of information sources may be modified without departing from the scope of the invention.

In order to communicate with these information sources, one or more application programming interfaces (API) may be used. The API may be installed to the VCS 1, the ND 53 or both.

Voice-based information sources 104 may include, but are not limited to, recorded telephone conversations, recorded in-vehicle conversations, stored voicemails, and the like. The telephone and in-vehicle conversations may be recorded and stored on the VCS 1, on the ND 53 and/or remotely (such as on a server in cloud 61).

It will be appreciated that voice recognition technology, which may or may not be a separate module from manager 100 and installed to VCS 1, may be used to identify information in the voice-based information source 104. Further, a confidence level may be additionally or alternatively used to identify information in a voice based information source 104. The confidence level may be defined by the voice recognition software. Confidence levels may be used in a manner that is known in the art. In one embodiment, an off-board (or cloud-based) server 110 may communicate with the VCS 1 when a confidence level 108 is low. The server 110 may transcribe the voice-based input to text (e.g., using speech-to-text technology) and transmit the text-based result to the VCS 1. Alternatively, there may be a human transcriber receiving the voice-based information from the server 110 for transcription. The human transcribe may perform the transcription in real-time or near real-time. In another embodiment, the VCS 1 may have installed speech-to-text technology which may perform the transcription process and transmit the text based result to the manager 100. It will be appreciated that voice recognition software or logic may additionally be used to recognize and interpret verbal personal communications.

Text-based information sources 106 may include, but are not limited to, text messages and electronic-mail messages (including sent and received messages). The text-based information may be received from memory of the nomadic device 53 or from remote servers (e.g., via an e-mail program). The manager 100 may be programmed with, or may communicate with, logic that recognizes and can interpret the text-based information. It will be appreciated that text recognition and interpretation software or logic may additionally be used to recognize and interpret non-verbal personal communications.

The profile information source 102 may include information about the user including, but not limited to, identification of family members and other contacts, service shops frequented, favorite restaurants, affiliations, and the like.

Profile information may be input by the user on a website and stored on a remote server or in the memory of the VCS 1.

A navigation-based information source 112 may include information relating to the user's navigation behavior which may be relevant to generating navigation routes. This may include, but is not limited to, route history and navigation settings (e.g., traffic avoidance, scenic route, shortest route, etc.).

A personal contacts information source 114 may include information relating to the user's personal contacts and interaction with the personal contacts. This information may be obtained from different sources including, but not limited to, phonebook contacts, social networking contacts, and electronic mail address book contacts. Other information in the personal contacts information source 114 may include, but is not limited to, frequency of communication with contacts (e.g., via email, phone, etc.), duration of phone calls, last name of contacts, area codes, relationship information, and affiliations.

A social networking information source 116 may include relevant information associated with the user from social networking tools such as FACEBOOK and TWITTER. Such information may include events, invites, appointments, profile information in the social networking accounts and/or the user's contacts, and affiliated clubs, groups, and organizations. It will be appreciated that the social networking information source 116 may also include instant messaging (IM) tools including, but not limited to, stand alone IM programs and IM programs included as a tool in electronic mail programs, social networking programs, and the like.

A calendar information source 118 may include information about calendared events. This information may include, but is not limited to, frequency of events, dates, times, subject/description of the calendared events, organizer of the calendared events, invitees of calendared events, and affiliated groups, clubs, and organization that are included on the calendar. As described above, not all events or activities managed by the manager 100 may be in the calendar information source 118. There may be events and activities that are provided in other information sources provided above.

A user behavior information source 120 may include learned information about the user that may be relevant to managing the unmanaged information. Such information may include, but is not limited to, decision/conversation outcomes, the user's punctuality, the user's routines, and GPS breadcrumbing. As a non-limiting example, user behavior may be useful in generating a navigation route. In some embodiments, historical information about the user's behaviors (described below) may be used. For example, if the user has historically rejected Mexican as a choice for dinner, the manager 100 may not offer this option as a recommendation in the future. As another example, if the user has regularly visited the same Italian venue for lunch, when the manager 100 detects that lunch plans are being made (based on a personal communication) the manager 100 may ask the user if he or she would like to be navigated to the same Italian venue.

The user's punctuality may also be used to manage events. For example (and without limitation), a user needs to be at a certain location by a certain time. However, in a text message, she indicates that she will be late. The manager 100 may calculate a route that reduces or eliminates her tardiness.

In one embodiment, the user behavior information source 120 may use artificial intelligence software (not shown) for learning these behaviors. The artificial intelligence software may or may not be a separate module from the manager 100.

In one embodiment, the information from the information source(s) may be transmitted to and stored in memory of the CPU 3 and the manager 100 may receive the information from memory for processing. The information may be stored in persistent or non-persistent memory. In some embodiments, some information may be stored in non-persistent memory while other information is stored in persistent memory.

It will be appreciated that one or more information sources may be utilized by the manager 100. For example, the manager 100 may utilize information from the calendar information source 118 to determine if an invite received by the user via a text message conflicts with events in the calendar 118. As another example, the user's wife may tell the user while on the phone in the vehicle to pick up dinner from a restaurant outside of the regularly taken route. Accordingly, a modified navigation route may be suggested to the user based on learned driving behavior from the learned user behavior information source 120 and navigation setting in the navigation information source 112. As another non-limiting example, the manager 100 may determine if a date and time in an invite sent via e-mail to the user conflicts with multiple events in one day stored in voice-based information sources 104, text-based information sources 106, and social networking information sources 116. These events may be prioritized based on relationship information in the personal contacts information source 114.

One or more devices (including, but not limited to, ND 53, display 4, remote server(s) 124, speaker(s) 13, and/or navigation 54, 60) may be used to perform actions in response to processing by the manager 100. These actions may include, but are not limited to, presenting a scheduling conflict, requesting the user to respond to a conflict, requesting confirmation to schedule an event, responding to an activity or event (e.g., transmitting a return email, placing a phone call, or transmitting a return posting to a social networking website), requesting confirmation to add or delete a personal contact, routing a navigation route, requesting confirmation to navigate a route, and the like.

As described above, using logic that is programmed to the manager 100, the event and information decision manager 100 may handle unmanaged information using information from the information source(s). In particular, manager 100 may determine when to trigger messages in response to unmanaged information and how to handle responses to these message(s). Further, the manager 100 may be programmed to identify unmanaged information. Unmanaged information may include information that has not been acted upon by the manager 100. Unmanaged information may come from live telephone conversations, live in-vehicle conversations, text messages, electronic mail messages, messages on social networking sites, and the like.

Response handling may or may not include occupant interaction. By way of example and not limitation, unmanaged information may be received by the manager 100 based on a posting on a social networking website (such as the occupant is invited to dinner at 7 PM). The manager 100 may determine if a conflict exists with this invite based on, for example, information in the occupant's calendar, i.e., the calendar information source 118 (which may be on the nomadic device 53). If a message to the occupant states that a conflict exist with a previously scheduled activity, the occupant may manually input a response to this message (e.g., allow or reject the conflicting engagement). This message(s) may be presented to the user audibly or visually (e.g., textually and/or graphically). Audible messages may include, but are not limited to, voice-based messages, alerts, beeps, chimes, and the like. Alternatively, the manager 100 may determine that a conflict exists and automatically accept or reject the invite. These responses may be based on decision factors (described below) which the manager 100 may utilize as part of the handling process logic. Further details about the unmanaged information, including how it is received, are described below.

Managing unmanaged information may include transmitting a response to another. In the above examples, a response may be transmitted to the person inviting the occupant that the occupant accepts or rejects the invitation. The response may be a return electronic mail message, text message, posting on a social networking site, and the like. A response may also include placing a return phone call (or asking the occupant if they would like to place a call) to the other party.

The various response programs may be automatically activated and/or run in response to instructions from the manager 100 that a response is to be sent. The programs may be installed on the nomadic device 53 or on the VCS 1. In some embodiments, if the response is a text-based response, the occupant may use speech to text technology to generate the response message. In further embodiments, the manager 100 may automatically generate the response electronic mail, text, or social networking message (e.g., by using responses that are "canned" or at least partially "canned").

In one embodiment, when an action is taken based on the response, the occupant may be notified of the action. The notification may be a confirmation that an action was taken based on the response. For example, if the conflict is allowed, the occupant may be notified of this action. This notification may be audible and/or visual.

The decision logic of manager 100 may be run when one or more automatic and/or manual inputs are received by the manager 100. That is, the manager 100 may be automatically activated and loaded in the background of the VCS 1 whenever a vehicle is powered (e.g., at a key on event), but the decision logic may not be run until the input(s) are received. In one embodiment, these inputs may additionally cause the manager 100 itself to be activated with each input.

Automatic inputs may be due to active actions and/or behaviors of the user which may cause the manager 100 to run the logic automatically. As such, the manager 100 may wait for (or listen for) input(s) and, when received, process the input(s) using the decision logic. Non-exhaustive examples of such actions/behaviors may include live verbal conversations (e.g., in vehicle and/or on a mobile phone), live textual conversations (e.g., electronic mail and text messaging), vehicle events (such as key-on and key-off events), a passage of time (e.g., when the logic is scheduled to run periodically or at predetermined time(s)), and navigation travel. Further details of this process will be described below.

The decision logic may be manually run when the occupant desires that the information source(s) be analyzed for handling by the manager 100. Manual inputs may be received when automatic inputs are not received (e.g., and without limitation, due to an occupant override such that automatic inputs are not received). For example, if unmanaged information is included in an email to meet for dinner at 7 PM, the user may submit a manual command to instruct the manager 100 to handle this unmanaged information. For example, the occupant may request the manager 100 to retrieve the invited time from the email and determine if the invited time conflicts with another engagement. As another example, the occupant may request the manager 100 to retrieve the name of the restaurant from the email which may input the POI or address to the navigation system.

Manual inputs may also be received while the action/behavior is occurring. In the above example, if the friend invites the occupant for dinner at 7 PM during a telephone conversation, the occupant can submit the manual input during this conversation to determine, for example, if there is a conflict.

Manual inputs may include inputs from the occupant including, but not limited to, tactile inputs (e.g., in-vehicle button presses from a steering wheel, touchscreen HMI, capacitive button, etc.) and/or audible inputs (e.g., voice-based commands). Further details of this process will be described below.

The decision manager 100 may utilize one or more decision factors as part of the information handling determination process. These decision factors may be used in determining the likelihood that a user wants or does not want an event or an action to occur. In using these decision factors, the manager 100 may or may not communicate with voice recognition technology depending on the information source and the decision factor to be used. In some embodiments, the manager 100 may include artificial intelligence capabilities by using predictive logic. As an example of the artificial intelligence capabilities, the predictive logic may learn that the occupant leaves work between 6:30 PM and 7:00 PM everyday. This information may be gathered based on GPS data and time data received from the vehicle. If the manager 100 determines that the occupant has made dinner plans for 7 PM (e.g., based on an information source), the manager 100 may send instructions to the navigation device 54 and/or 60 to route the occupant from work to the restaurant (without the occupant having to enter the destination address) when the user powers (i.e., at a key-on event) the vehicle. In some embodiments, the decisions factors may be obtained from the information source(s). The voice recognition technology and the artificial intelligence logic may or may not be implemented as separate software modules from the manager 100.

Examples of such decision factors may include:

Voice inflection: The inflection in a voice can be a factor in handling unmanaged information. The voice may or may not be the vehicle occupant's voice. For example, and without limitation, the voice inflection of the person with whom the user is conversing may be used. Handling unmanaged information based on voice inflection may include, but is not limited to, scheduling events, prioritizing multiple events, and prioritizing multiple navigation routes. For example, if a high inflection in a voice (equating to excitement) is sensed, the manager 100 may give priority to an event such that it may ask the occupant if a conflicting event (which is prescheduled) should be postponed or cancelled to give priority to the new event. As another example, the manager 100 may use inflection in the occupant's voice to prioritize a navigation route for multiple destinations. The manager 100 may or may not first confirm with the user whether the action should be performed. Voice inflection may be detected and analyzed by voice recognition technology according to methods known in the art. As described above, the manager 100 may include voice recognition logic or otherwise be in communication with a voice recognition module.

Historical Information/learned behavior: An occupant's historical behavior may be used as learned behavior for managing unmanaged information. The historical behavior may pertain to (without limitation) conversation histories (e.g., and without limitation, the occupant's responses to invitations from particular organizations or individuals), route histories, and arrival time and departure time histories. For example, if the occupant receives an invite on a social networking site from an organization to attend a meeting, which the user has historically rejected, the manager 100 may assume that the user will do the same with the new invitation. As another example, if the user leaves for work between 8 AM and 8:30 AM, and an invitation for breakfast at 8:15 AM is received, the manager 100 may transmit a rejection to the invitation. The manager 100 may or may not first confirm with the use whether to reject the invitation.

Personal relationships and affiliations: The occupant's relationships with other people and/or organizations may be used in managing unmanaged information. Relationship information may be determined based on last names, organization names, relationship information listed on social networking sites, relationship information provided in a user profile, information in an address book on the nomadic device, and the like. As an example, if the manager 100 determines from a telephone conversation that the vehicle needs to go to a service shop, a relationship with a servicing entity may be identified. Once identified, the occupant may be navigated to, or requested if they would like to be navigated to, that service shop. The relationship information may be also used to prioritize tasks. For example, if a user scheduled to drop off drycleaning at 6:00 PM, but receives a text to pick up his or her son from a friend's house at 5:45 PM which is 30 minutes in the opposite direction, the manager 100 may use the relationship information to prioritize the user's tasks and modify the navigation route based on the prioritization. As another example, the user may have an in-vehicle telephone conversation (or receive a text message or an email, etc.) with a person who the user is connected to on a social networking website. However, the user does not have that person's contact information listed in his or her address book on the ND 53. The manager 100 may recognize that a relationship exist with the person based on the contact information listed in the person's social networking profile. The manager 100 may ask the user if the contact information should be listed in the address book.

Frequency: The frequency of user interactions and actions may be used to manage the unmanaged information. The frequency of interactions with certain individuals, the frequency of certain events, the frequency of invitation acceptances and rejections from certain individuals and/or organizations, frequency of communication with others, and frequency of visits to certain locations are some non-limiting and non-exhaustive examples of this decision factor. For example, if the user schedules lunch for 12 PM everyday, but on a particular day has scheduled meetings between 11 AM and 2 PM based on information detected by the manager 100 in an email, the manager 100 may use this information to remind the user to eat a snack or lunch. In some embodiments, the manger may further ask the user if he or she would like suggestions for a restaurant and, further, be navigated to a restaurant.

It will be appreciated that there may be instances where the decision factors may not be used based on user preference or availability of the decision factor. In some embodiments, using decision factors may be an option that the user may turn on and off.

Figure 3:
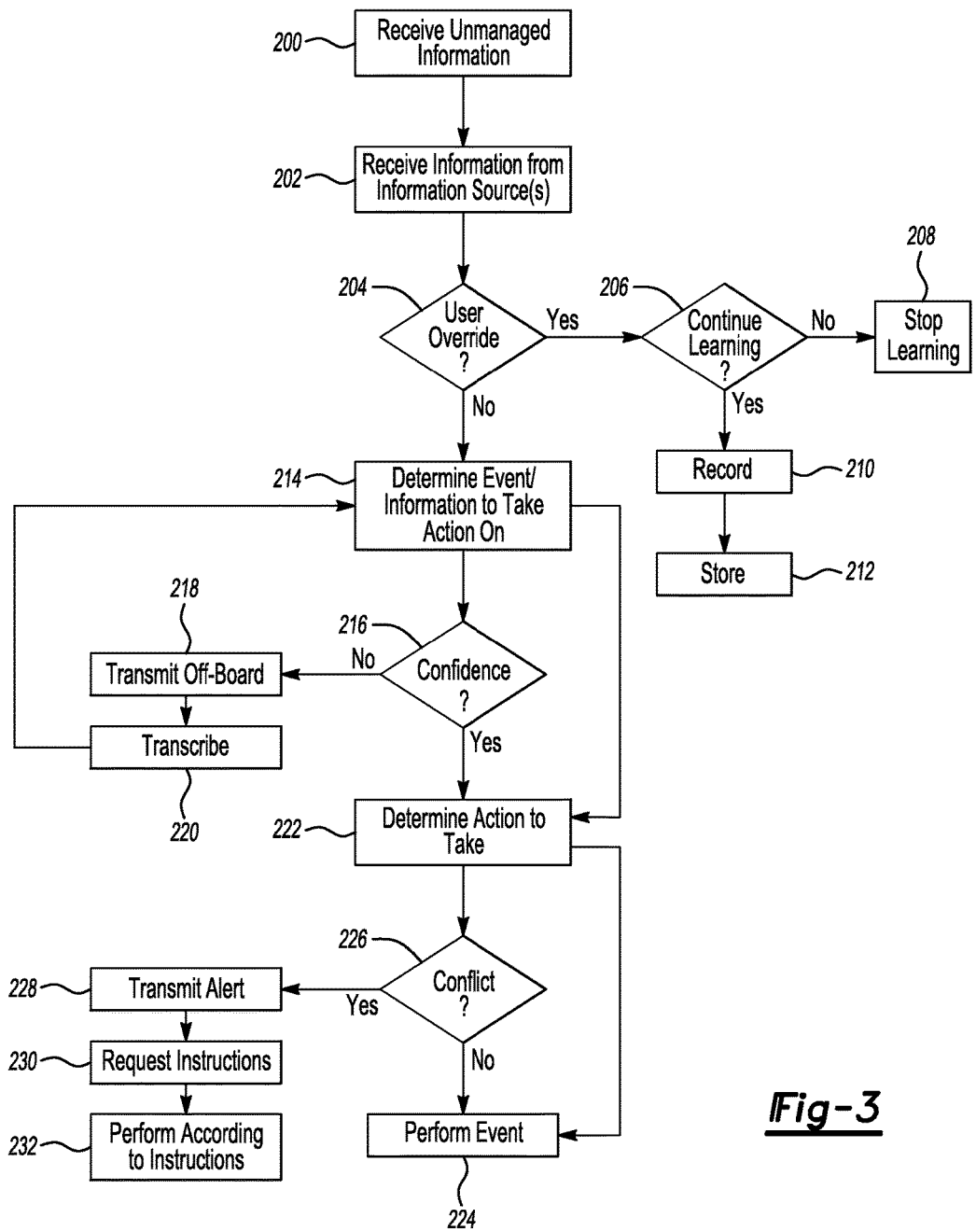
FIG. 3 illustrates an in-vehicle process for performing a personal event for a vehicle occupant.

FIG. 3 illustrates the logic that the manager 100 may perform in managing and facilitating user events. It will be appreciated that the disclosure and arrangement of FIG. 2 may be modified or re-arranged to best fit a particular implementation of the various embodiments of the invention.

The unmanaged information may be received from one or more inputs described above (i.e., a live telephonic conversation, etc.) (block 200). When the unmanaged information is received, the information from the information source(s) may or may not have already been received (block 202). With respect to dates or times, these may be received as specific information, such as 2 PM or January 1, or non-specific information such as "tomorrow" or "now." In one embodiment, the information from the information source(s) is received nearly simultaneously with the unmanaged information.

A user may have an override ability which prevents the manager 100 from receiving unmanaged information and taking action on the unmanaged information. Examples of actions that may be taken on unmanaged information are provided above. However, in some embodiments, the manager 100 may still continue to receive unmanaged information, but not take any action on it. As such, a determination may be made whether a user override is in place (block 204). If so, a further determination may be made whether the manager 100 should continue learning (block 206). If not, then the manager 100 stops learning (block 208). Otherwise, the input information is recorded (block 210) and stored (block 212).

If the user does not override the system, the event or information on which the manager 100 should take action is determined (block 214). For example, dates and/or times may be determined, personal contacts may be identified, and/or locations may be identified from the unmanaged information.

As described above, unmanaged information may come from verbal communications. In this case, a confidence level in identifying the event/information to take action on may be determined (block 216). If the confidence level is low, the information may be transmitted off-board (block 218) and transcribed (block 220). Otherwise, the event/information is transmitted to the manager 100 and the action to taken upon it is determined (block 222).

With unmanaged information coming from non-verbal personal communication, the confidence level determination may not be made. As such, when the event/information to take action on is identified, the manager 100 may determine what action to take on the event/information (block 222). Examples of actions that may be taken are provided above. The event may be performed as illustrated in block 224.

In some embodiments, determining the action to take may lead to finding a scheduled conflict as described above. Thus, a determination may be made whether a conflict exists (block 226). If there is no conflict, the event may be performed (block 224). If there is a conflict, an alert may be transmitted indicated the existence of a conflict (block 228). The alert may be audible and/or textual.

The manager 100 may request instructions on what to do with the conflict (block 230). The manager 100 may then perform according to the instructions (block 232).

The following non-limiting examples provide further illustration to the various embodiments of the invention.

Example 1

User A makes a call to his friend to have lunch at a local pizzeria. During the conversation on the phone, User A is reminded via a text message that a DVD must be returned by noon at the video store. User A enters his or her vehicle and connects the phone to the VCS 1. Without entering any POI information, the VCS 1 provides a suggestive alert which asks if User A would like to see a navigation route for completing the following tasks:
- a. Picking up their friend from work
- b. Dropping off videos by noon
- c. Eating lunch at the pizzeria
- d. Dropping off their friend from work
- e. Returning to work within an 1 hour.

User A replies "yes" to the route and the navigation instructions are downloaded to the vehicle. Turn by turn instructions are then provided to User A.

Example 2

User B is talking to his wife in the car while driving home from running errands. During the in-vehicle conversation, User B receives an email from his friend that asks "Do you and the wife have any plans next Saturday? My wife and I are having a get together around 7 pm." As User B and his wife are trying to remember if there are available, they are provided a speech-based reminder by the VCS 1 that they are scheduled to have dinner with his parents from 6 PM-8 PM next Saturday. The VCS 1 asks if a reply e-mail should be sent to decline the invitation from the friend.

Example 3

User C is driving to work in her car. A co-worker posts a message on a social networking website asking User C if she has plans for the upcoming company break which User C receives in her vehicle. User C can't remember the dates of the upcoming break. Since the User C earlier submitted an override of the manager 100, but chose that the manager 100 continue to learn, User C inputs a speech-based request to the VCS 1 requesting the date of the company break. The VCS 1 provides an audible response by saying, "Your next company holiday is August 10-12."

While exemplary embodiments are illustrated and described above, it is not intended that these embodiments illustrate and describe all possibilities. Rather, the words used in the specification are words of description rather than limitation, and it is understood that various changes may be made without departing from the spirit and scope of the invention.

What is claimed:

1. A system comprising:
a processor configured to:
receive a digital communication including text in a body of the communication corresponding to a schedulable event;
identify the schedulable event in the text of the communication body, by comparison of words in the text to predefined words designated as identifying schedulable events;
query a user to determine if the schedulable event should be scheduled; and
responsive to user confirmation to the query, schedule the schedulable event.

2. The system of claim 1 wherein the digital communication is a text message.

3. The system of claim 1 wherein the digital communication is a social network posting.

4. The system of claim 1 wherein the digital communication is an email.

5. A computer-implemented method comprising:
analyzing a digital communication to or from a user;
identifying, via a processor, text in a body text of the digital communication corresponding to a schedulable event, by comparison of words in the text to predefined words designated as identifying schedulable events;
determining if the schedulable event conflicts with already scheduled events in a user calendar; and
responsive to a determination that no conflict exists, scheduling schedulable event in the user calendar.

6. The method of claim 5 wherein identifying text corresponding to the schedulable event includes parsing the communication for a trigger predefined as indicating a schedulable event.

7. The method of claim 6 wherein the trigger includes at least one of a predefined keyword, keyphrase, or abbreviation.

8. The method of claim 5 wherein the communication is a social networking message.

9. The method of claim 5 wherein the communication is an electronic mail or a text message.

10. A computer-implemented method comprising:
identifying, at a vehicle computer, text in a body of a received digital communication corresponding to a schedulable event, including text identifying an event location the identifying done by comparison of words in the text to predefined words designated as identifying schedulable events; and
scheduling the schedulable event in a user calendar, including adding the event location identified by the body text as a scheduled event location.

* * * * *